United States Patent
Quan (10) Patent No.: US 11,265,761 B2
(45) Date of Patent: Mar. 1, 2022

(54) METHOD OF CONFIGURING UPLINK DATA COMPRESSION AND DEVICE THEREOF

(71) Applicant: CHINA ACADEMY OF TELECOMMUNICATIONS TECHNOLOGY, Beijing (CN)

(72) Inventor: Haiyang Quan, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 9 days.

(21) Appl. No.: 16/966,423

(22) PCT Filed: Jan. 23, 2019

(86) PCT No.: PCT/CN2019/072792
§ 371 (c)(1),
(2) Date: Jul. 30, 2020

(87) PCT Pub. No.: WO2019/149120
PCT Pub. Date: Aug. 8, 2019

(65) Prior Publication Data
US 2021/0037416 A1 Feb. 4, 2021

(30) Foreign Application Priority Data
Feb. 2, 2018 (CN) .......................... 201810107370.3

(51) Int. Cl.
*H04W 28/06* (2009.01)
*H04L 29/06* (2006.01)
(Continued)

(52) U.S. Cl.
CPC ............. *H04W 28/06* (2013.01); *H04L 69/04* (2013.01); *H04W 84/042* (2013.01)

(58) Field of Classification Search
None
See application file for complete search history.

(56) References Cited

U.S. PATENT DOCUMENTS

2008/0253332 A1  10/2008  Ore et al.
2013/0326631 A1*  12/2013  Cartmell ............... H04W 12/80
                                                                  726/26
(Continued)

FOREIGN PATENT DOCUMENTS

CN    101669385 A    3/2010
CN    101925054 A    12/2010
(Continued)

OTHER PUBLICATIONS

"Pre-Defined Dictionary for UDC", R2-1710453, 3GPP TSG-RAN WG2 Meeting #99bis, Prague, Czech Republic, Oct. 9-13, 2017.
(Continued)

*Primary Examiner* — Kenny S Lin
(74) *Attorney, Agent, or Firm* — Ladas & Parry, LLP (57) ABSTRACT

A method of configuring Uplink Data Compression and a device thereof are provided. The method includes: in a case that first UDC configuration information sent by a target base station is received by a user equipment, configuring, by the user equipment, an operator-defined dictionary stored by the user equipment for a compression processing of uplink data, according to the first UDC configuration information, where the first UDC configuration information includes indication information of using the operator-defined dictionary stored by the user equipment, and a target PLMN of the target base station is different from a source PLMN of a source base station of the user equipment.

20 Claims, 3 Drawing Sheets

(51) Int. Cl.
*H04W 84/04* (2009.01)
*H04L 69/04* (2022.01)

(56) References Cited

U.S. PATENT DOCUMENTS

| | | | |
|---|---|---|---|
| 2014/0051426 | A1 | 2/2014 | Siomina et al. |
| 2015/0326695 | A1 | 11/2015 | Pang et al. |
| 2016/0081136 | A1 | 3/2016 | Karampatsis et al. |
| 2016/0337255 | A1 | 11/2016 | Balasubramanian et al. |
| 2019/0141567 | A1* | 5/2019 | Liu .................. H04L 69/04 |
| 2019/0141571 | A1* | 5/2019 | Kim .................. H04W 28/04 |
| 2020/0351712 | A1* | 11/2020 | Kim .................. H04L 69/04 |
| 2020/0396640 | A1 | 12/2020 | Quan et al. |

FOREIGN PATENT DOCUMENTS

| | | |
|---|---|---|
| CN | 104718781 A | 6/2015 |
| CN | 107094142 A | 8/2017 |
| WO | 2014110773 A1 | 7/2014 |

OTHER PUBLICATIONS

"Further Discussion on Pre-Defined Dictionary for UDC", R2-1712881, 3GPP TSG RAN WG2 Meeting #100, Reno, USA, Nov. 27-Dec. 1, 2017.

"Pre-Defined Dictionary for UDC", R2-1713352, 3GPP TSG RAN WG2 Meeting #100, Reno, USA, Nov. 27-Dec. 1, 2017.

First office action and search report from CN app. No. 201810107370.3, dated April 21, 2020, with English translation from Global Dossier.

Extended European Search Report from EP app. No. 19746893.7, dated Jan. 14, 2021.

First Office Action from TW app. No. 108103748, dated Dec. 9, 2020, with machine English translation.

International Search Report from PCT/CN2019/072792, dated Apr. 1, 2019, with English translation from WIPO.

Written Opinion from the International Searching Authority from PCT/CN2019/072792, dated Apr. 1, 2019, with English translation from WIPO.

International Preliminary Report on Patentability from PCT/CN2019/072792, dated Aug. 4, 2020, with English translation from WIPO.

Japanese office Action issued in the corresponding JP application No. 2020-541905 dated Oct. 5, 2021, with English translation provided by Global dossier, all pages.

MediaTek Inc., Summary of email discussion [99bis#29][LTE/UDC] Operator controlled dictionary issue [MTK][online],3GPP TSG RAN WG2 #100 R2-1713907, Internet<URL:http://www.3gpp.org/ftp/tsg_ran/WG2_RL2/TSGR2_100/Docs/R2-1713907.zip>, Nov. 17, 2012, all pages.

\* cited by examiner

METHOD OF CONFIGURING UPLINK DATA COMPRESSION AND DEVICE THEREOF

CROSS REFERENCE TO RELATED APPLICATIONS

The present application is the U.S. national phase of PCT Application PCT/CN2019/072792 filed on Jan. 23, 2019, which claims a priority to Chinese patent application No. 201810107370.3 filed on Feb. 2, 2018, the disclosures of which are incorporated herein by reference in their entireties.

TECHNICAL FIELD

The present disclosure relates to the field of mobile communications, and in particular to a method of configuring Uplink Data Compression and a device thereof.

BACKGROUND

Uplink Data Compression (UDC) technology is that a user equipment (UE) compresses and sends uplink application layer data or signaling, and decompresses the compressed data on the base station side, so as to save the amount of data of radio interface transmission and save uplink resources.

In the uplink data compression, there may be two solutions for keeping the terminal and the base station able to compress/decompress correctly. One is that the terminal establishes the data content in the compression buffer during the process of sending the uplink data, and the base station side retains it, and then decompress the data based on the appropriate rules. The other is that the terminal and the base station download pre-definition or save some profile information for decompression in advance, and it may be determined which profile to be started through some signaling interaction. Once an agreement is reached, the terminal and the base station may ensure correct compression and decompression. The profile information may include a compression method, and information about the decompressed buffer or the decompressed mapping map.

In the LTE system in the related art, there are two preset dictionaries for UDC, one is the dictionary for compression of Session Initiation Protocol (SIP) defined in RFC 3485 that has been standardized, and the other is a dictionary defined by the operator (hereinafter referred to as the operator-defined dictionary). User equipment usually stores only one operator-defined dictionary.

In the standardization of the UDC technology of the Long Term Evolution (LTE) system, it is considered to support the dictionary defined by the operator. That is, the user equipment uses the operator-defined dictionary for uplink data compression, and the base station uses the operator-defined dictionary for data decompression. When the user equipment stores the operator-defined dictionary, it can report that the user equipment stores the information of the operator-defined dictionary. In addition, the user equipment usually only needs to support one operator-defined dictionary, that is, cannot store multiple operator definition dictionaries.

User devices often move geographically. In the UDC operator-defined dictionary solution in the related art, for roaming scenarios, the user equipment may not report supporting the operator-defined dictionary. However, this makes it impossible to apply the operator-defined dictionary for uplink data compression. For the handover scenario, if the current public land mobile network (PLMN) of the user equipment is updated, the new PLMN (target PLMN) will obtain the capability information of the user equipment from the old PLMN (source PLMN), which contains the capabilities of UDC, and if the operator-defined dictionaries of the new and old PLMNs are different, the new PLMN will use the wrong operator-defined dictionary, which will cause the failure of data compression/decompression, resulting in a communication failure.

SUMMARY

The objective of the present disclosure is to provide a method of configuring uplink data compression method and a device thereof, so as to enable the network and user equipment to correctly use the operator-defined dictionary or not to use the operator-defined dictionary, when the PLMN is updated.

To solve the above technical issues, a method of configuring Uplink Data Compression (UDC) is provided in an embodiment of the present disclosure, including:

in a case that first UDC configuration information sent by a target base station is received by a user equipment, configuring, by the user equipment, an operator-defined dictionary stored by the user equipment for a compression processing of uplink data, according to the first UDC configuration information;

where the first UDC configuration information includes indication information of using the operator-defined dictionary stored by the user equipment, and a target Public Land Mobile Network (PLMN) of the target base station is different from a source PLMN of a source base station of the user equipment.

Optionally, the method further includes:

in a case that second UDC configuration information sent by the target base station is received by the user equipment, configuring, by the user equipment, a predetermined standard dictionary for the compression processing of uplink data or a cancelling of the compression processing of uplink data, according to the second UDC configuration information;

where the second UDC configuration information includes indication information of using the predetermined standard dictionary or an empty dictionary without content.

Optionally, before the first UDC configuration information or the second UDC configuration information is received, the method further includes:

acquiring, by the user equipment, the operator-defined dictionary and a list of available PLMNs, and storing, by the user equipment, the operator-defined dictionary and the list of available PLMNs locally, where the list of available PLMNs includes identifications of PLMNs capable of using the operator-defined dictionary.

Optionally, before the first UDC configuration information or the second UDC configuration information is received, the method further includes:

in the case that the user equipment accesses the target PLMN, determining, by the user equipment, whether the target PLMN is in the list of available PLMNs stored by the user equipment;

in the case that the target PLMN is in the list of available PLMNs, sending to the target base station, by the user equipment, indication information indicating that the user equipment supports the operator-defined dictionary;

in the case that the target PLMN is not in in the PLMN list, sending to the target base station, by the user equipment, indication information indicating that the user equipment does not support the operator-defined dictionary.

Optionally, subsequent to the acquiring, by the user equipment, the operator-defined dictionary and the list of available PLMNs and storing, by the user equipment, the operator-defined dictionary and the list of available PLMNs locally, the method further includes:

sending, by the user equipment, the list of available PLMNs to the source PLMN;

acquiring, by the user equipment, a version number of the operator-defined dictionary when acquiring the operator-defined dictionary; and sending, by the user equipment, the version number of the operator-defined dictionary to the source PLMN.

Optionally, the user equipment sends the list of available PLMNs to the source PLMN through a UE-EUTRA-Capability message.

Optionally, subsequent to the acquiring, by the user equipment, the operator-defined dictionary and the list of available PLMNs and storing, by the user equipment, the operator-defined dictionary and the list of available PLMNs locally, the method further includes:

sending, by the user equipment, an identification of a home PLMN (HPLMN) of the user equipment to the source PLMN.

A method of configuring Uplink Data Compression (UDC) is further provided in an embodiment of the present disclosure, including:

in the case that a target base station determines that a first operator-defined dictionary stored by a user equipment is usable in a target Public Land Mobile Network (PLMN), sending, by the target base station, first UDC configuration information to the user equipment;

where the target PLMN is a PLMN of the target base station and is different from a source PLMN of a source base station of the user equipment, and the first UDC configuration information includes indication information of using the first operator-defined dictionary.

Optionally, the method further includes:

in the case that the target base station determines that the first operator-defined dictionary is unusable in the target PLMN, sending, by the target base station, second UDC configuration information to the user equipment, where the second UDC configuration information includes indication information of using a predetermined standard dictionary or an empty dictionary without content.

Optionally, the target base station determining that the first operator-defined dictionary stored by the user equipment is usable in the target PLMN includes:

receiving, by the target base station, indication information which is sent by the user equipment and indicates that the user equipment supports the first operator-defined dictionary.

Optionally, the target base station determining that the first operator-defined dictionary is unusable in the target PLMN includes:

receiving, by the target base station, indication information which is sent by the user equipment and indicates that the user equipment does not support the first operator-defined dictionary.

Optionally, the determining whether the first operator-defined dictionary is usable in the target PLMN further includes:

acquiring, by the target base station, a list of available PLMNs from the source PLMN of the user equipment, where the list of available PLMNs includes identifications of PLMNs capable of using the first operator-defined dictionary;

determining whether the first operator-defined dictionary is usable in the target PLMN, according to a determination of whether the target PLMN is in the list of available PLMNs.

Optionally, the determining whether the first operator-defined dictionary is usable in the target PLMN further includes:

acquiring, by the target base station, a list of available PLMNs and a version number of the first operator-defined dictionary stored by the user equipment, from the source PLMN of the user equipment, where the list of available PLMNs includes identifications of PLMNs capable of using the first operator-defined dictionary;

in the case that the target PLMN is in the list of available PLMNs and a version number of the first operator-defined dictionary stored by the target PLMN is the same as the version number of the first operator-defined dictionary stored by the user equipment, determining that the first operator-defined dictionary is usable in the target PLMN, otherwise determining that the first operator-defined dictionary is unusable in the target PLMN;

in the case that the target base station fails to acquire the list of available PLMNs from the source PLMN of the user equipment, the determining whether the first operator-defined dictionary is usable in the target PLMN further includes:

sending, by the target base station, a terminal capability query message to the user equipment;

in the case that the target base station receives indication information which is sent by the user equipment and indicates that the user equipment supports the first operator-defined dictionary, determining that the first operator-defined dictionary is usable in the target PLMN; and in the case that the target base station receives indication information which is sent by the user equipment and indicates that the user equipment does not support the first operator-defined dictionary, determining that the first operator-defined dictionary is unusable in the target PLMN.

Optionally, the determining whether the first operator-defined dictionary is usable in the target PLMN further includes:

acquiring, by the target base station, an identification of a home PLMN (HPLMN) of the user equipment from the source PLMN of the user equipment;

determining by the target base station, according to a locally maintained correspondence of PLMN and operator-defined dictionary, whether an operator-defined dictionary corresponding to the target PLMN is the same as an operator-defined dictionary corresponding to the HPLMN; and determining whether the first operator-defined dictionary is usable in the target PLMN, according to a determination of whether the operator-defined dictionary corresponding to the target PLMN is the same as the operator-defined dictionary corresponding to the HPLMN.

Optionally, the determining whether the first operator-defined dictionary is usable in the target PLMN includes:

acquiring, by the target base station, an identification of a HPLMN of the user equipment from the source PLMN of the user equipment;

determining by target base station, according to a locally maintained correspondence of PLMN, operator-defined dictionary and version number of dictionary, whether an operator-defined dictionary corresponding to the target PLMN is the same as an operator-defined dictionary corresponding to the HPLMN and a version number of the operator-defined dictionary corresponding to the target PLMN is the same as a version number of the operator-defined dictionary corresponding to the HPLMN; and determining whether the first operator-defined dictionary is usable in the target PLMN, according to a determination of whether the operator-defined dictionary corresponding to the target PLMN is the same as the operator-defined dictionary corresponding to the HPLMN and the version number of the operator-defined dictionary corresponding to the target PLMN is the same as the version number of the operator-defined dictionary corresponding to the HPLMN;

in the case that the target base station fails to acquire the identification of the HPLMN of the user equipment from the source PLMN of the user equipment, the determining whether the first operator-defined dictionary is usable in the target PLMN further includes:

sending, by the target base station, a terminal capability query message to the user equipment;

in the case that the target base station receives indication information which is sent by the user equipment and indicates that the user equipment supports the first operator-defined dictionary, determining that the first operator-defined dictionary is usable in the target PLMN; and in the case that the target base station receives indication information which is sent by the user equipment and indicates that the user equipment does not support the first operator-defined dictionary, determining that the first operator-defined dictionary is unusable in the target PLMN.

A user equipment is further provided in an embodiment of the present disclosure, including: a transceiver, a memory, a processor and a computer program stored in the memory and executable on the processor, where the transceiver is configured to receive first UDC configuration information sent by a target base station;

the processor is configured to read a program in the memory to:

in a case that first UDC configuration information sent by a target base station is received, configure an operator-defined dictionary stored by the user equipment for a compression processing of uplink data according to the first UDC configuration information;

where the first UDC configuration information includes indication information of using the operator-defined dictionary stored by the user equipment, and a target Public Land Mobile Network (PLMN) of the target base station is different from a source PLMN of a source base station of the user equipment.

Optionally, the transceiver is further configured to receive second UDC configuration information sent by the target base station;

the processor is further configured to read the program in the memory to: in a case that second UDC configuration information sent by the target base station is received, configure a predetermined standard dictionary for the compression processing of uplink data or a cancelling of the compression processing of uplink data according to the second UDC configuration information;

where the second UDC configuration information includes indication information of using the predetermined standard dictionary or an empty dictionary without content.

Optionally, the processor is further configured to read the program in the memory to: before the first UDC configuration information or the second UDC configuration information is received, acquire the operator-defined dictionary and a list of available PLMNs and store the operator-defined dictionary and the list of available PLMNs locally, where the list of available PLMNs includes identifications of PLMNs capable of using the operator-defined dictionary;

the processor is further configured to read the program in the memory to: before the first UDC configuration information or the second UDC configuration information is received and in the case that the user equipment roams to the target PLMN, determine whether the target PLMN is in the list of available PLMNs stored by the user equipment;

the processor is further configured to read the program in the memory to: acquire a version number of the operator-defined dictionary when acquiring the operator-defined dictionary;

the transceiver is further configured to: in the case that the target PLMN is in the list of available PLMNs, send indication information indicating that the user equipment supports the operator-defined dictionary to the target base station;

the transceiver is further configured to: in the case that the target PLMN is not in the list of available PLMNs, send indication information indicating that the user equipment does not support the operator-defined dictionary to the target base station;

the transceiver is further configured to: in the case that the operator-defined dictionary and the list of available PLMNs are acquired and the operator-defined dictionary and the list of available PLMNs are stored locally, send the list of available PLMNs to the source PLMN;

the transceiver is further configured to send the version number of the operator-defined dictionary to the source PLMN; and the transceiver is further configured to: in the case that the operator-defined dictionary and the list of available PLMNs are acquired and the operator-defined dictionary and the list of available PLMNs are stored locally, send an identification of a home PLMN (HPLMN) of the user equipment to the source PLMN.

A user equipment is further provided in an embodiment of the present disclosure, including: a first configuring unit configured to: in a case that first UDC configuration information sent by a target base station is received, configure an operator-defined dictionary stored by the user equipment for a compression processing of uplink data, according to the first UDC configuration information;

where the first UDC configuration information includes indication information of using the operator-defined dictionary stored by the user equipment, and a target Public Land Mobile Network (PLMN) of the target base station is different from a source PLMN of a source base station of the user equipment.

Optionally, the user equipment further includes:

a first determining unit configured to: before the first UDC configuration information or the second UDC configuration information is received and in the case that the user equipment roams to the target PLMN, determine whether the target PLMN is in the list of available PLMNs stored by the user equipment, where the list of available PLMNs includes identifications of PLMNs capable of using the operator-defined dictionary;

a first sending unit configured to: in the case that the target PLMN is in the list of available PLMNs, send indication information indicating that the user equipment supports the operator-defined dictionary to the target base station.

Optionally, the user equipment further includes:

a third sending unit, configured to send the list of available PLMNs to the source PLMN, where the list of available PLMNs includes identifications of PLMNs capable of using the operator-defined dictionary.

A target base station is further provided in an embodiment of the present disclosure, including: a transceiver, a memory, a processor and a computer program stored in the memory and executable on the processor, where the processor is configured to read the computer program in the memory to: determine whether a first operator-defined dictionary stored by a user equipment is usable in a target Public Land Mobile Network (PLMN);

the transceiver is configured to: send first UDC configuration information to the user equipment, in the case that the first operator-defined dictionary stored by the user equipment is usable in the target PLMN;

where the target PLMN is a PLMN of the target base station and is different from a source PLMN of a source base station of the user equipment, and the first UDC configuration information includes indication information of using the first operator-defined dictionary.

Optionally, the transceiver is further configured to: in the case that the first operator-defined dictionary is unusable in the target PLMN, send second UDC configuration information to the user equipment, where the second UDC configuration information includes indication information of using a predetermined standard dictionary or an empty dictionary without content.

Optionally, the processor is further configured to read the computer program in the memory to:

in the case that indication information which is sent by the user equipment and indicates that the user equipment supports the first operator-defined dictionary is received, send the first UDC configuration information to the user equipment;

in the case that indication information which is sent by the user equipment and indicates that the user equipment does not support the first operator-defined dictionary is received, send the second UDC configuration information to the user equipment.

Optionally, the processor is further configured to read the computer program in the memory to: acquire a list of available PLMNs from the source PLMN of the user equipment, where the list of available PLMNs includes identifications of PLMNs capable of using the first operator-defined dictionary; determine whether the first operator-defined dictionary is usable in the target PLMN, according to a determination of whether the target PLMN is in the list of available PLMNs;

the processor is further configured to read the computer program in the memory to: acquire a list of available PLMNs and a version number of the first operator-defined dictionary stored by the user equipment, from the source PLMN of the user equipment, where the list of available PLMNs includes identifications of PLMNs capable of using the first operator-defined dictionary; in the case that the target PLMN is in the list of available PLMNs and a version number of the first operator-defined dictionary stored by the target PLMN is the same as the version number of the first operator-defined dictionary stored by the user equipment, determine that the first operator-defined dictionary is usable in the target PLMN, otherwise determine that the first operator-defined dictionary is unusable in the target PLMN;

the processor is further configured to read the computer program in the memory to:

in the case that the target base station fails to acquire the list of available PLMNs from the source PLMN of the user equipment, send a terminal capability query message to the user equipment;

in the case that indication information which is sent by the user equipment and indicates that the user equipment supports the first operator-defined dictionary is received, determine that the first operator-defined dictionary is usable in the target PLMN; and in the case that indication information which is sent by the user equipment and indicates that the user equipment does not support the first operator-defined dictionary is received, determine that the first operator-defined dictionary is unusable in the target PLMN.

Optionally, the processor is further configured to read the computer program in the memory to:

acquire an identification of a home PLMN (HPLMN) of the user equipment from the source PLMN of the user equipment;

determine, according to a locally maintained correspondence of PLMN and operator-defined dictionary, whether an operator-defined dictionary corresponding to the target PLMN is the same as an operator-defined dictionary corresponding to the HPLMN; and determine whether the first operator-defined dictionary is usable in the target PLMN, according to a determination of whether the operator-defined dictionary corresponding to the target PLMN is the same as the operator-defined dictionary corresponding to the HPLMN;

the processor is further configured to read the computer program in the memory to:

acquire an identification of a HPLMN of the user equipment from the source PLMN of the user equipment;

determine, according to a locally maintained correspondence of PLMN, operator-defined dictionary and version number of dictionary, whether an operator-defined dictionary corresponding to the target PLMN is the same as an operator-defined dictionary corresponding to the HPLMN and a version number of the operator-defined dictionary corresponding to the target PLMN is the same as a version number of the operator-defined dictionary corresponding to the HPLMN; and determine whether the first operator-defined dictionary is usable in the target PLMN, according to a determination of whether the operator-defined dictionary corresponding to the target PLMN is the same as the operator-defined dictionary corresponding to the HPLMN and the version number of the operator-defined dictionary corresponding to the target PLMN is the same as the version number of the operator-defined dictionary corresponding to the HPLMN;

the processor is further configured to read the computer program in the memory to:

send a terminal capability query message to the user equipment;

in the case that indication information which is sent by the user equipment and indicates that the user equipment supports the first operator-defined dictionary is received, determine that the first operator-defined dictionary is usable in the target PLMN; and in the case that indication information which is sent by the user equipment and indicates that the user equipment does not support the first operator-defined dictionary is received, determine that the first operator-defined dictionary is unusable in the target PLMN.

A target base station is further provided in an embodiment of the present disclosure, including: a first configuring unit configured to:

in the case that a first operator-defined dictionary stored by a user equipment is usable in a target Public Land Mobile Network (PLMN), send first UDC configuration information to the user equipment;

where the target PLMN is a PLMN of the target base station and is different from a source PLMN of a source base station of the user equipment, and the first UDC configuration information includes indication information of using the first operator-defined dictionary.

Optionally, the first configuring unit is further configured to: send the first UDC configuration information to the user equipment in the case that indication information which is sent by the user equipment and indicates that the user equipment supports the first operator-defined dictionary is received;

the target base station further includes:

a first acquiring unit, configured to acquire a list of available PLMNs from the source PLMN of the user equipment, where the list of available PLMNs includes identifications of PLMNs capable of using the first operator-defined dictionary;

a first determining unit, configured to determine whether the first operator-defined dictionary is usable in the target PLMN, according to a determination of whether the target PLMN is in the list of available PLMNs.

A computer-readable storage medium is further provided in an embodiment of the present disclosure, where a computer program is stored in the computer-readable storage medium, and a processor executes the computer program to:

in a case that first UDC configuration information sent by a target base station is received, configure an operator-defined dictionary stored by the user equipment for a compression processing of uplink data, according to the first UDC configuration information;

where the first UDC configuration information includes indication information of using the operator-defined dictionary stored by the user equipment, and a target Public Land Mobile Network (PLMN) of the target base station is different from a source PLMN of a source base station of the user equipment.

A computer-readable storage medium is further provided in an embodiment of the present disclosure, where a computer program is stored in the computer-readable storage medium, and a processor executes the computer program to:

in the case that a first operator-defined dictionary stored by a user equipment is usable in a target Public Land Mobile Network (PLMN), send first UDC configuration information to the user equipment;

where the target PLMN is a PLMN of the target base station and is different from a source PLMN of a source base station of the user equipment, and the first UDC configuration information includes indication information of using the first operator-defined dictionary.

Compared with the related art, according to the method of configuring UDC and the device thereof, when the PLMN of the user equipment is updated, it is able use the correct operator-defined dictionary or not use an operator-defined dictionary in the uplink data compression, thereby improving the compression rate of uplink data, saving the amount of data of radio interface transmission and uplink resources, and reducing or avoiding the communication failure caused by differences in the operator-defined dictionaries.

BRIEF DESCRIPTION OF THE DRAWINGS

In order to more clearly explain the technical solutions of the embodiments of the present disclosure, the drawings in the description of the embodiments of the present disclosure will be briefly described below. Obviously, the drawings in the following description are only some embodiments of the present disclosure. For those of ordinary skill in the art, without paying creative work, other drawings may also be obtained based on these drawings.

DETAILED DESCRIPTION

In order to make the technical issues, technical solutions and advantages to be solved by the present disclosure clearer, the following will describe in detail with reference to the accompanying drawings and specific embodiments. In the following description, specific details such as specific configurations and components are provided only to assist in a comprehensive understanding of embodiments of the present disclosure. Therefore, it should be clear to those skilled in the art that various changes and modifications can be made to the embodiments described herein without departing from the scope and spirit of the present disclosure. In addition, descriptions of known functions and constructions are omitted for clarity and conciseness.

It should be understood that "one embodiment" or "an embodiment" mentioned throughout the specification means that a specific feature, structure, or characteristic related to the embodiment is included in at least one embodiment of the present disclosure. Therefore, "in one embodiment" or "in an embodiment" appearing throughout the specification does not necessarily refer to the same embodiment. In addition, these specific features, structures, or characteristics may be combined in one or more embodiments in any suitable manner.

In various embodiments of the present disclosure, it should be understood that the size of the sequence numbers of the following processes does not mean the order of execution, and the execution order of each process should be determined by its function and inherent logic, and should not be implemented by the present disclosure. The embodiment process of the examples constitutes no limitation.

In the embodiment of the present disclosure, the network side device generally refers to a base station. In the embodiments of the present disclosure, the form of the base station is not limited, and may be a macro base station (Macro Base Station), a micro base station (Pico Base Station), a Node B (called 3G mobile base station), an enhanced base station (eNB), Home enhanced base station (Femto eNB or Home eNode B or HomeeNB or HeNB), relay station, access point, RRU (Remote Radio Unit, remote radio frequency module), Remote Radio Head (RRH), 5G mobile communication Network-side nodes in the system, such as gNB, Central Unit (CU) and Distributed Unit (DU), etc. The user equipment may be a mobile phone (or cell phone), or other devices capable of sending or receiving wireless signals, including smartphones, personal digital assistants (PDAs), wireless modems, wireless communication devices, handheld devices, laptop computers, Cordless phones, wireless local loop (WLL) stations, Customer Premise Equipment (CPE) or mobile smart hotspots, smart appliances, or other devices that can convert mobile signals into WiFi signals can communicate with mobile spontaneously without human operation Network communication equipment, etc.

As mentioned above, the existing UDC operator-defined dictionary solution is not suitable for roaming scenarios and PLMN switching scenarios. For example, when the user equipment roams, no matter whether the operator-defined dictionary used by the newly accessed PLMN is the same as the operator-defined dictionary of the user equipment, the user equipment cannot use its own operator-defined dictionary, which may cause some initial data packets to have a lower compression rate and poorer compression. As for the handover scenario of handover PLMN, there may also be misuse of different operator-defined dictionaries under the new PLMN, resulting in failure of compression and decompression.

Figure 1:
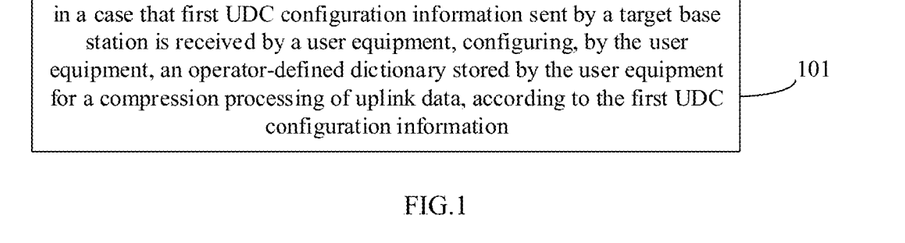
FIG. 1 is a flowchart of a method of configuring uplink data compression in an embodiment of the present disclosure.

In view of this, a method of configuring UDC is provided in an embodiment of the present disclosure, to solve some or all of the issues described above. Referring to FIG. 1, a method of configuring UDC is provided in an embodiment of the present disclosure, applied to a user equipment side and including:

Step 101: in a case that first UDC configuration information sent by a target base station is received by a user equipment, configuring, by the user equipment, an operator-defined dictionary stored by the user equipment for a compression processing of uplink data, according to the first UDC configuration information;

where the first UDC configuration information includes indication information of using the operator-defined dictionary stored by the user equipment, and a target Public Land Mobile Network (PLMN) of the target base station is different from a source PLMN of a source base station of the user equipment.

Here, the target base station is a PLMN newly accessed by the user equipment. When the PLMN update occurs, the user equipment accesses the new PLMN (target PLMN) from the old PLMN (that is, the source PLMN). Specifically, the user equipment may roam to or switch to the target PLMN.

Since the operator-defined dictionary of the source PLMN and that of the target PLMN may not be the same, the user equipment needs to configure the operator-defined dictionary stored by the user equipment for uplink data compression processing only after receiving the first UDC configuration information sent by the target base station. Through the above steps, according to the embodiments of the present disclosure, it is able to enable the target PLMN to control whether the user equipment uses the operator-defined dictionary stored by the user equipment, so that when the operator-defined dictionary of the target PLMN and the operator-defined dictionary stored by the user equipment are the same, it is able to enable the operator-defined dictionary for uplink data compression/decompression, which may increase the uplink data compression rate and save the amount of data of the transmission of radio interface and save uplink resources.

According to the embodiment of the present disclosure, the target base station may send the first UDC configuration information to the user equipment when it is determined that the operator-defined dictionary stored by the user equipment is usable by the target PLMN. Conversely, the target base station may send second UDC configuration information to the user equipment when it is determined that the operator-defined dictionary of the user equipment cannot be used by the target PLMN, the second UDC configuration information includes indication information of using the predetermined standard dictionary (such as a dictionary defined in RFC 3485 for SIP signaling compression) or an empty dictionary without content (no dictionary is used for compression/decompression at this time). Therefore, the above method in the embodiment of the present disclosure may further include the following steps:

Step 102: in a case that second UDC configuration information sent by the target base station is received by the user equipment, configuring, by the user equipment, a predetermined standard dictionary for the compression processing of uplink data or a cancelling of the compression processing of uplink data, according to the second UDC configuration information.

Through the above steps, it is able to control the user equipment and the network side to use the standard dictionary or not to use the dictionary for uplink data compression/decompression when the operator-defined dictionary of the target PLMN and the operator-defined dictionary stored by the user equipment are different, which may reduce or avoid communication failures caused by differences in operator-defined dictionaries.

For the scenario where the user equipment roams to the target PLMN, the user equipment may receive the first UDC configuration information or the second UDC configuration information sent by the target base station through a signaling message in the process of detachment/attachment. For the scenario where the user equipment is switched to the target PLMN, the user equipment may receive the first UDC configuration information or the second UDC configuration information sent by the target base station through a radio resource control (RRC) reconfiguration new message.

In order to determine whether the operator-defined dictionary stored by the user equipment is usable in the target PLMN, according to the embodiment of the present disclosure, that may be indicated by the list of available PLMNs corresponding to the operator-defined dictionary. Here, the list of available PLMNs includes identifications of PLMNs capable of using the operator-defined dictionary. In the embodiment of the present disclosure, before receiving the first and second UDC configuration information, the user equipment may acquire the operator-defined dictionary and its corresponding list of available PLMNs in advance, and store the same locally in the user equipment. The specific acquisition method may be: 1) configure the above operator-defined dictionary and its corresponding list of available PLMNs in user equipment in advance, for example, configured in the factory settings of the device; 2) delivered by the core network, for example, delivered to the user equipment through over-the-air (OTA) download technology or through a technology similar to the Access Network Discovery and Selection Function (ANDSF).

In a first embodiment, the user equipment may determine whether the operator-defined dictionary stored by the user equipment is usable in the target PLMN. At this time, when accessing the target PLMN, the user equipment may determine whether the target PLMN is in the list of available PLMNs according to a locally stored operator-defined dictionary and its corresponding list of available PLMNs:

1) When the target PLMN is in the list of available PLMNs, the user equipment may send to the target base station first indication information indicating that the user equipment supports the operator-defined dictionary; after the target base station receives the first indication information, it can determine that the operator-defined dictionary stored by the user equipment is usable in the target PLMN. At this time, the target base station directly sends the first UDC configuration information to the user equipment to configure the user equipment to enable the operator-defined dictionary; subsequently, the user equipment and the target base station can perform uplink data compression/decompression based on the same operator-defined dictionary.

2) When the target PLMN is not in in the list of available PLMNs, the user equipment may send to the target base station second indication information indicating that the user equipment does not support the operator-defined dictionary; after the target base station receives the second indication information, it can determine that the operator-defined dictionary stored by the user equipment cannot be used in the target PLMN. At this time, the target base station directly sends the second UDC configuration information to the user equipment to configure the user equipment not to enable the operator-defined dictionary or use a standard dictionary.

In a second embodiment, the target base station may determine whether the operator-defined dictionary stored by the user equipment is usable in the target PLMN. At this time, after acquiring the operator-defined dictionary and the list of available PLMNs and storing them locally, the user equipment may send the list of available PLMNs to the source PLMN. Specifically, the user equipment may report the list of available PLMNs to the source PLMN when reporting the UDC capability of the user equipment to the source PLMN. For example, the list of available PLMNs is sent to the source PLMN through a UE-EUTRA-Capability message. A specific example is provided below, and the following information may be added to the UE-EUTRA-Capability message to send the list of available PLMNs, where availablePLMN-List represents in which PLMNs the operator defined dictionary may be used.

dictionary of the user equipment cannot be used in the target PLMN, the target base station sends the second UDC configuration information.

Furthermore, considering that the operator-defined dictionary may include a version number, when obtaining the operator-defined dictionary, the user equipment in the embodiment of the present disclosure may also acquire the version number of the operator-defined dictionary, and then the user equipment further sends the version number of the operator-defined dictionary to the source PLMN. After receiving the list of available PLMNs and the version number reported by the user equipment, the source PLMN may store the same in the source PLMN, for example, stored in a mobility management entity (MME). At this time, the target PLMN obtains the list of available PLMNs and the version number of the operator-defined dictionary stored by the user equipment from the source PLMN of the user equipment. Specifically, when acquiring the capability information of the user equipment, the target base station may acquire the list of available PLMNs and the version number. When making a determination, only when the target PLMN is in the list of available PLMNs, and the version number of the operator-defined dictionary stored by the target PLMN matches the version number of the operator-defined dictionary stored by the user equipment, it is determined that the operator-defined dictionary stored by the user equipment is usable in the target PLMN, otherwise, it is determined that the operator-defined dictionary stored by the user equipment cannot be used in the target PLMN.

In the above second embodiment, the target base station needs to acquire the list of available PLMNs of the operator-defined dictionary of the user equipment from the source PLMN. In order to reduce the amount of interactive data between networks, a third embodiment is provided below.

```
PDCP-Parameters-v15xy ::=        SEQUENCE {
supportedUDC-r15                     SupportedUDC-r15 OPTIONAL
}
SupportedUDC-r15 ::=             SEQUENCE {
supportedStandardDic-r15         ENUMERATED {supported}      OPTIONAL,
supportedOperatorDic-r15         SupportedOperatorDic-r15    OPTIONAL,
availablePLMN-List-r15           PLMN-IdentityList3-r11      OPTIONAL
}
```

After receiving the list of available PLMNs reported by the user equipment, the source PLMN may store the same in the source PLMN, for example, stored in a mobility management entity (MME). When the terminal accesses the target PLMN, the target base station (i.e., the base station in the target PLMN currently accessed by the user equipment) may obtain the list of available PLMNs from the source PLMN of the user equipment. Specifically, the target base station may, when acquiring the capability information of the user equipment, obtain the list of available PLMNs. Then, the target base station may determine whether the operator-defined dictionary of the user equipment is usable in the target PLMN according to a determination of whether the target PLMN is in the list of available PLMNs. When the operator-defined dictionary of the user equipment is usable in the target PLMN, the target base station sends the first UDC configuration information; when the operator-defined In the third embodiment, the base station may maintain the correspondence between PLMN and operator-defined dictionary, and the correspondence records the operator-defined dictionary usable by the PLMN. The correspondence may be pre-configured at the base station and updated through the inter-network interface. In this way, after obtaining the operator-defined dictionary and the list of available PLMNs and storing them locally, the user equipment in this embodiment of the present disclosure may send the identification of the user equipment's home public land mobile network (HPLMN) to the source PLMN. A specific example is provided below, and the following information may be added to the UE-EUTRA-Capability message to send the HPLMN identification (ID), where plmnIdentity-r15 is a HPLMN ID or a PLMN ID of operator bonded by the operator-defined dictionary.

```
SupportedUDC-r15 ::=     SEQUENCE {
supportedStandardDic-r15     ENUMERATED {supported}        OPTIONAL,
```

| | | |
|---|---|---|
| supportedOperatorDic-r15 | SupportedOperatorDic-r15 | OPTIONAL, |
| plmnIdentity-r15 | PLMN-Identity | OPTIONAL |
| } | | |

After receiving the identification of the HPLMN reported by the user equipment, the source PLMN may store the same in the source PLMN, for example, stored in a mobility management entity (MME). Subsequently, when the target base station needs to determine whether the operator-defined dictionary stored by the user equipment is usable in the target PLMN, the target base station may obtain the identification of the HPLMN of the user equipment from the source PLMN of the user equipment, and then determine whether the operator-defined dictionary corresponding to the target PLMN and the operator-defined dictionary corresponding to the HPLMN are the same, according to a locally maintained correspondence of PLMN and operator-defined dictionary by the target base station, and then the target base station may determine whether the operator-defined dictionary of the user equipment is usable in the target PLMN, according to a determination of whether the operator-defined dictionary corresponding to the target PLMN is the same as the operator-defined dictionary corresponding to the HPLMN.

Furthermore, considering the version number of dictionary, in the above third embodiment, the user equipment may further send the HPLMN ID of the user equipment and the version number of the operator-defined dictionary to the source PLMN. A specific example is provided below. The following information can be added to the UE-EUTRA-Capability message to send the version number of the operator-defined dictionary, where supportedOperatorDic-r15 represents the version number, (0 . . . 15) is the value range of the version number; plmnIdentity-r15 is a HPLMN ID or a PLMN ID of operator bonded by the operator-defined dictionary.

| | | |
|---|---|---|
| SupportedUDC-r15 ::= | SEQUENCE { | |
| supportedStandardDic-r15 | ENUMERATED {supported} | OPTIONAL, |
| supportedOperatorDic-r15 | INTEGER (0..15) | OPTIONAL, |
| plmnIdentity-r15 | PLMN-Identity | OPTIONAL |
| } | | |

When determining whether the operator-defined dictionary stored by the user equipment is usable in the target PLMN, the target base station may obtain the identification of the HPLMN of the user equipment from the source PLMN of the user equipment. Then, according to the locally maintained correspondence of PLMN, operator-defined dictionary and number of dictionary version by the target base station, the target base station determines whether an operator-defined dictionary corresponding to the target PLMN is the same as an operator-defined dictionary corresponding to the HPLMN and a version number of the operator-defined dictionary corresponding to the target PLMN is the same as a version number of the operator-defined dictionary corresponding to the HPLMN, and then determines whether the operator-defined dictionary of the user equipment is usable in the target PLMN based on a determination of whether the operator-defined dictionary corresponding to the target PLMN is the same as the operator-defined dictionary corresponding to the HPLMN and the version number of the operator-defined dictionary corresponding to the target PLMN is the same as the version number of the operator-defined dictionary corresponding to the HPLMN. Specifically, only when the operator-defined dictionary corresponding to the target PLMN is the same as the operator-defined dictionary corresponding to the HPLMN and the version number of the operator-defined dictionary corresponding to the target PLMN is the same as the version number of the operator-defined dictionary corresponding to the HPLMN, it is determined that the operator-defined dictionary of the user equipment is usable in the target PLMN, otherwise, it is determined that the operator-defined dictionary of the user equipment is unusable in the target PLMN.

Figure 2:
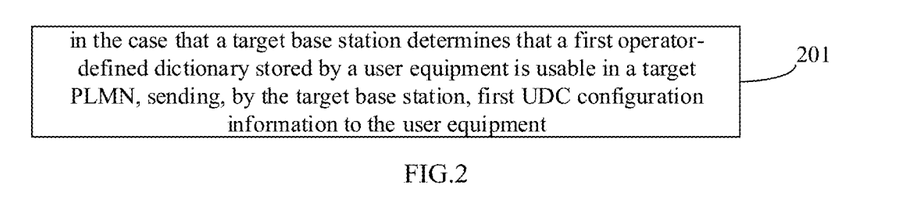
FIG. 2 is another flowchart of a method of configuring uplink data compression in an embodiment of the present disclosure.

The above mainly describes the method of configuring uplink data compression according to the embodiment of the present disclosure at the user equipment side and in conjunction with the target base station side. Referring to FIG. 2 below, a flow chart of the method on the target base station side is given, where the target base station is a base station that the user equipment accesses in the target PLMN. As shown in FIG. 2, the method includes:

Step 201: in the case that a target base station determines that a first operator-defined dictionary stored by a user equipment is usable in a target Public Land Mobile Network (PLMN), sending, by the target base station, first UDC configuration information to the user equipment;

where the target PLMN is a PLMN of the target base station and is different from a source PLMN of a source base station of the user equipment, and the first UDC configuration information includes indication information of using the first operator-defined dictionary.

Here, after the target base station sends the first UDC configuration information, it can decompress the uplink data subsequently sent by the user equipment using the first operator-defined dictionary, thereby improving the compression rate of uplink data and saving the amount of data of radio interface transmission and uplink resources.

When the target base station determines that the first operator-defined dictionary cannot be used in the target PLMN, the above method in the embodiment of the present disclosure may further include the following steps:

Step 202: in the case that the target base station determines that the first operator-defined dictionary is unusable in the target PLMN, sending, by the target base station, second UDC configuration information to the user equipment, where the second UDC configuration information includes indication information of using a predetermined standard dictionary or an empty dictionary without content.

Through the above steps, it is able to reduce or avoid communication failures caused by differences in the operator-defined dictionaries of the target base station and the user equipment.

Corresponding to the first embodiment above, in step 201, the target base station may directly determine, when receiving indication information which is sent by the user equipment and indicates that the user equipment supports the first operator-defined dictionary, that the first operator-defined dictionary stored by the user equipment is usable in the target PLMN; and in step 202, the target base station may directly determine, when receiving indication information which is sent by the user equipment and indicates that the user equipment does not support the first operator-defined dictionary, that the first operator-defined dictionary stored by the user equipment is unusable in the target PLMN. It can be seen that in the above steps 201 and 202, the target base station does not need to judge the availability of the operator-defined dictionary, but directly delivers different configuration information according to the different indication information received.

Figure 3:
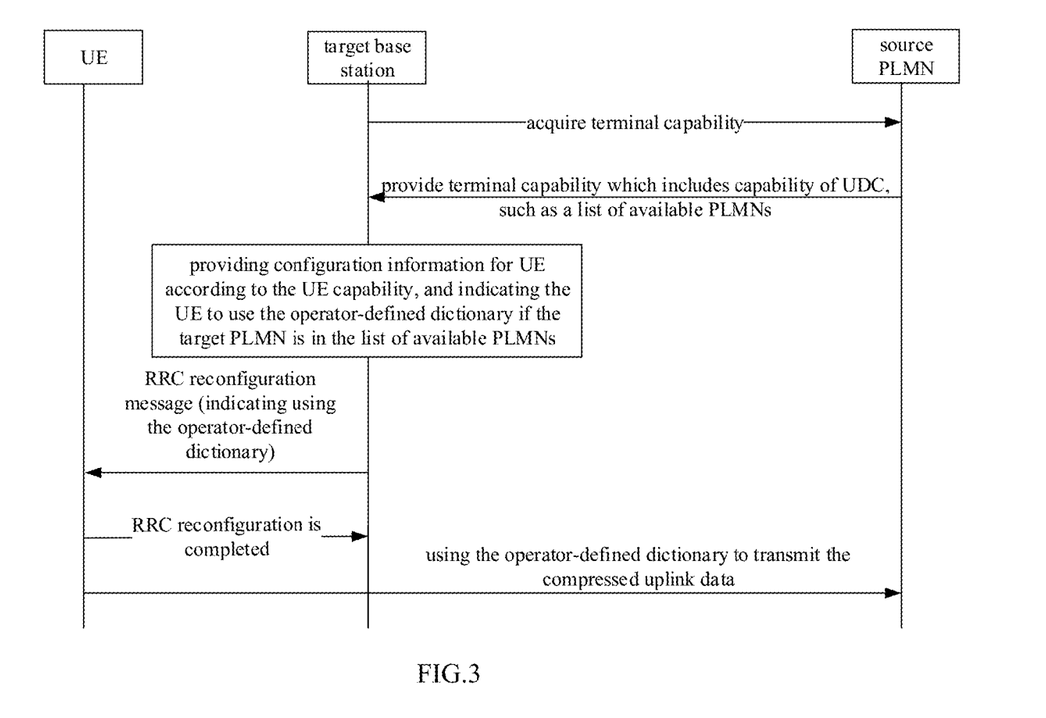
FIG. 3 is another flowchart of a method of configuring uplink data compression in an embodiment of the present disclosure.

Corresponding to the second embodiment above, the target base station needs to judge the availability of the operator-defined dictionary. At this time, the target base station may obtain a list of available PLMNs from the source PLMN of the user equipment when the user equipment accesses (for example, the user equipment roams or switches to the target base station), and the list of available PLMNs includes identifications of PLMNs capable of using the first operator-defined dictionary; then, according to a determination of whether the target PLMN is in the list of available PLMNs, the target base station determines whether the first operator-defined dictionary is usable in the target PLMN. FIG. 3 shows the information interaction between related devices in the second embodiment.

Considering the dictionary version number, the target base station may acquire the list of available PLMNs and the version number of the first operator-defined dictionary stored by the user equipment from the source PLMN of the user equipment when the user equipment accesses; then, only when the target PLMN is in the list of available PLMNs and a version number of the first operator-defined dictionary stored by the target PLMN is the same as the version number of the first operator-defined dictionary stored by the user equipment, the target base station determines that the first operator-defined dictionary is usable in the target PLMN; otherwise, the target base station determines that the first operator-defined dictionary is unusable in the target PLMN.

Corresponding to the third embodiment above, the target base station also needs to judge the availability of the operator-defined dictionary. At this time, the target base station acquires an identification of a HPLMN of the user equipment from the source PLMN of the user equipment; then the target base station determines, according to a locally maintained correspondence of PLMN and operator-defined dictionary, whether an operator-defined dictionary corresponding to the target PLMN is the same as an operator-defined dictionary corresponding to the HPLMN; and then the target base station determines whether the first operator-defined dictionary is usable in the target PLMN, according to a determination of whether the operator-defined dictionary corresponding to the target PLMN is the same as the operator-defined dictionary corresponding to the HPLMN.

Considering the version number of dictionary, the target base station acquires an identification of a HPLMN of the user equipment from the source PLMN of the user equipment; then the target base station determines, according to a locally maintained correspondence of PLMN, operator-defined dictionary and version number of dictionary, whether an operator-defined dictionary corresponding to the target PLMN is the same as an operator-defined dictionary corresponding to the HPLMN and a version number of the operator-defined dictionary corresponding to the target PLMN is the same as a version number of the operator-defined dictionary corresponding to the HPLMN; and then the target base station determines whether the first operator-defined dictionary is usable in the target PLMN, according to a determination of whether the operator-defined dictionary corresponding to the target PLMN is the same as the operator-defined dictionary corresponding to the HPLMN and the version number of the operator-defined dictionary corresponding to the target PLMN is the same as the version number of the operator-defined dictionary corresponding to the HPLMN.

In the embodiment of the present disclosure, in the above-mentioned second embodiment, the target base station needs to acquire the list of available PLMNs of the user equipment from the source PLMN, and in the above-mentioned third embodiment, the target base station needs to acquire the identification of HPLMN of the user equipment from the source PLMN. Due to communication failure or other reasons, the acquisition of the above information may fail. In view of this, the target base station in this embodiment of the present disclosure may further send a terminal capability query message to the user equipment in the case that the target base station fails to acquire the list of available PLMNs (corresponding to the second embodiment) or fails to acquire the identification of the HPLMN of the user equipment (corresponding to the third embodiment). After receiving the above query message, the user equipment performs judgment according to the first embodiment described above, and sends corresponding indication information. Subsequently, when receiving the indication information which is sent by the user equipment and indicates that the user equipment supports the first operator-defined dictionary, the target base station determines that the first operator-defined dictionary is usable in the target PLMN, and after receiving an indication information which is sent by the user equipment and indicates that the user equipment does not support the first operator-defined dictionary, the target base station determines that the first operator-defined dictionary is unusable in the target PLMN.

Based on the above method, a device for implementing the above method is further provided in an embodiment of the present disclosure.

Figure 4:
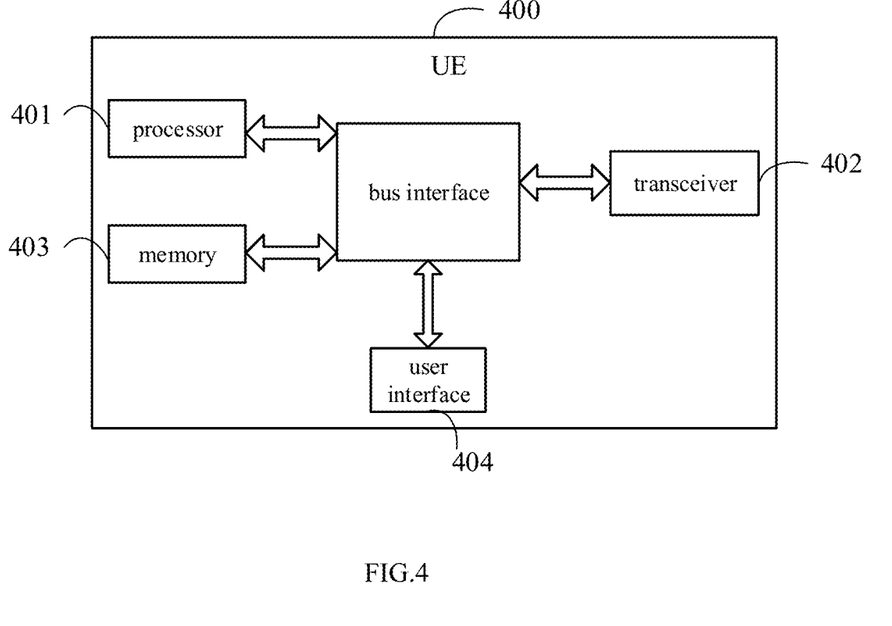
FIG. 4 is a schematic view of a user equipment in an embodiment of the present disclosure.

Referring to FIG. 4 which is a schematic view of a user equipment in an embodiment of the present disclosure, the user equipment 400 includes: a processor 401, a transceiver 402, a memory 403, a user interface 404, and a bus interface.

In the embodiment of the present disclosure, the user equipment 400 further includes: a computer program stored in the memory 403 and executable on the processor 401.

The transceiver 402 is configured to receive first UDC configuration information sent by a target base station.

The processor 401 is configured to read a program in the memory to:

in a case that first UDC configuration information sent by a target base station is received, configure an operator-defined dictionary stored by the user equipment for a compression processing of uplink data according to the first UDC configuration information;

where the first UDC configuration information includes indication information of using the operator-defined dictionary stored by the user equipment, and a target Public Land Mobile Network (PLMN) of the target base station is different from a source PLMN of a source base station of the user equipment.

In FIG. 4, the bus architecture may include any number of interconnected buses and bridges, specifically one or more processors represented by the processor 401 and various circuits of the memory represented by the memory 403 are linked together. The bus architecture can also link various other circuits such as peripheral devices, voltage regulators, and power management circuits, etc., which are well known in the art, and therefore, they will not be described further herein. The bus interface provides an interface. The transceiver 402 may be a plurality of elements, including a transmitter and a receiver, and provides a unit for communicating with various other devices on a transmission medium. For different user devices, the user interface 404 may also be an interface that can be externally connected to the required device. The connected devices include, but are not limited to, a keypad, a display, a speaker, a microphone and a joystick.

The processor 401 is responsible for managing the bus architecture and general processing, and the memory 403 may store data used by the processor 401 in performing operations.

The transceiver 402 is further configured to receive second UDC configuration information sent by the target base station; the processor 401 is further configured to read the program in the memory to: in a case that second UDC configuration information sent by the target base station is received, configure a predetermined standard dictionary for the compression processing of uplink data or a cancelling of the compression processing of uplink data according to the second UDC configuration information, where the second UDC configuration information includes indication information of using the predetermined standard dictionary or an empty dictionary without content.

The processor 401 is further configured to read the program in the memory to: before the first UDC configuration information or the second UDC configuration information is received, acquire the operator-defined dictionary and a list of available PLMNs and store the operator-defined dictionary and the list of available PLMNs locally, where the list of available PLMNs includes identifications of PLMNs capable of using the operator-defined dictionary.

Corresponding to the second embodiment hereinabove, the processor 401 is further configured to read the program in the memory to: before the first UDC configuration information or the second UDC configuration information is received and in the case that the user equipment roams to the target PLMN, determine whether the target PLMN is in the list of available PLMNs stored by the user equipment; the transceiver 402 is further configured to: in the case that the target PLMN is in the list of available PLMNs, send indication information indicating that the user equipment supports the operator-defined dictionary to the target base station.

Corresponding to the first embodiment hereinabove, the transceiver 402 is further configured to: in the case that the target PLMN is not in the list of available PLMNs, send indication information indicating that the user equipment does not support the operator-defined dictionary to the target base station.

Corresponding to the second embodiment hereinabove, the transceiver 402 is further configured to: in the case that the operator-defined dictionary and the list of available PLMNs are acquired and the operator-defined dictionary and the list of available PLMNs are stored locally, send the list of available PLMNs to the source PLMN.

Optionally, the transceiver 402 is further configured to send the list of available PLMNs to the source PLMN through a UE-EUTRA-Capability message.

Considering the version number of dictionary, the processor 401 is further configured to acquire a version number of the operator-defined dictionary when acquiring the operator-defined dictionary, and the transceiver 402 is further configured to send the version number of the operator-defined dictionary to the source PLMN.

Corresponding to the third embodiment hereinabove, the transceiver 402 is further configured to, after the operator-defined dictionary and the list of available PLMNs are acquired and stored locally, send an identification of a HPLMN of the user equipment to the source PLMN.

Figure 5:
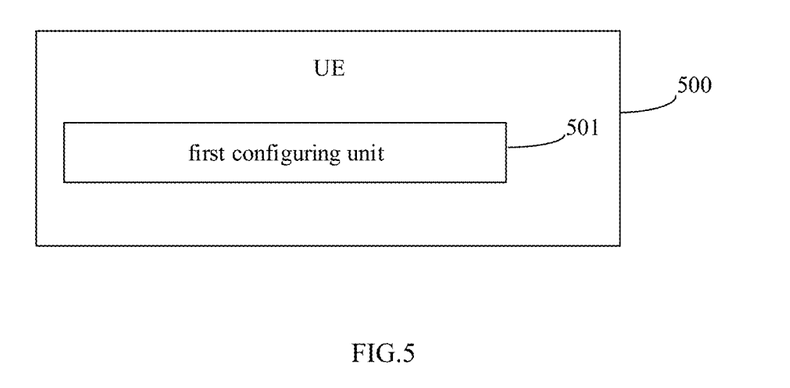
FIG. 5 is another schematic view of a user equipment in an embodiment of the present disclosure.

Referring to FIG. 5, a user equipment 500 is further provided in an embodiment of the present disclosure, including:

a first configuring unit 501 configured to: in a case that first UDC configuration information sent by a target base station is received, configure an operator-defined dictionary stored by the user equipment for a compression processing of uplink data, according to the first UDC configuration information, where the first UDC configuration information includes indication information of using the operator-defined dictionary stored by the user equipment, and a target Public Land Mobile Network (PLMN) of the target base station is different from a source PLMN of a source base station of the user equipment.

Optionally, the user equipment further includes:

a second configuring unit, configured to, in a case that second UDC configuration information sent by the target base station is received, configure a predetermined standard dictionary for the compression processing of uplink data or a cancelling of the compression processing of uplink data according to the second UDC configuration information, where the second UDC configuration information includes indication information of using the predetermined standard dictionary or an empty dictionary without content.

Optionally, the user equipment further includes:

a dictionary acquiring unit, configured to, before the first UDC configuration information or the second UDC configuration information is received, acquire the operator-defined dictionary and a list of available PLMNs and store the operator-defined dictionary and the list of available PLMNs locally, where the list of available PLMNs includes identifications of PLMNs capable of using the operator-defined dictionary.

Corresponding to the first embodiment hereinabove, the user equipment further includes:

a first determining unit, configured to: before the first UDC configuration information or the second UDC configuration information is received and in the case that the user equipment roams to the target PLMN, determine whether the target PLMN is in the list of available PLMNs stored by the user equipment, where the list of available PLMNs includes identifications of PLMNs capable of using the operator-defined dictionary;

a first sending unit, configured to: in the case that the target PLMN is in the list of available PLMNs, send indication information indicating that the user equipment supports the operator-defined dictionary to the target base station.

Corresponding to the first embodiment hereinabove, the user equipment further includes: a second sending unit, configured to, in the case that the target PLMN is not in the list of available PLMNs, send indication information indicating that the user equipment does not support the operator-defined dictionary to the target base station.

Corresponding to the second embodiment hereinabove, the user equipment further includes: a third sending unit, configured to send the list of available PLMNs to the source PLMN, where the list of available PLMNs includes identifications of PLMNs capable of using the operator-defined dictionary.

Optionally, the third sending unit is further configured to send the list of available PLMNs to the source PLMN through a UE-EUTRA-Capability message.

Considering the version number of dictionary, the dictionary acquiring unit, is further configured to acquire a version number of the operator-defined dictionary when acquiring the operator-defined dictionary, and the third sending unit is further configured to send the version number of the operator-defined dictionary to the source PLMN.

Corresponding to the third embodiment hereinabove, the user equipment further includes: a fourth sending unit, configured to: after the operator-defined dictionary and the list of available PLMNs are acquired and stored locally, send an identification of a HPLMN of the user equipment to the source PLMN.

Figure 6:
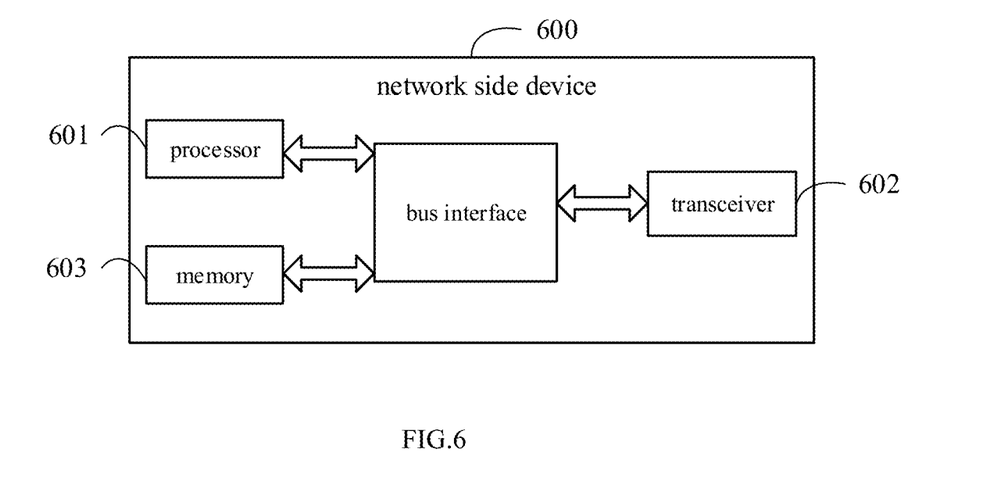
FIG. 6 is a schematic view of a target base station in an embodiment of the present disclosure.

Referring to FIG. 6, an embodiment of the present disclosure provides a schematic view of a target base station 600, including: a processor 601, a transceiver 602, a memory 603, and a bus interface.

In the embodiment of the present disclosure, the target base station 600 further includes: a computer program stored in the memory 603 and executable on the processor 601.

The processor 601 is configured to read the program in the memory 603 to: determine whether a first operator-defined dictionary stored by a user equipment is usable in a target PLMN.

The transceiver 602 is configured to send first UDC configuration information to the user equipment, in the case that the first operator-defined dictionary stored by the user equipment is usable in the target PLMN.

The target PLMN is a PLMN of the target base station and is different from a source PLMN of a source base station of the user equipment, and the first UDC configuration information includes indication information of using the first operator-defined dictionary.

In FIG. 6, the bus architecture may include any number of interconnected buses and bridges, specifically, one or more processors represented by the processor 601 and various circuits of the memory represented by the memory 603 are linked together. The bus architecture can also link various other circuits such as peripheral devices, voltage regulators, and power management circuits, etc., which are well known in the art, and therefore, they will not be described further herein. The bus interface provides an interface. The transceiver 602 may be a plurality of elements, including a transmitter and a receiver, and provides a unit for communicating with various other devices on a transmission medium.

The processor 601 is responsible for managing the bus architecture and general processing, and the memory 603 may store data used by the processor 601 in performing operations.

Optionally, the transceiver 602 is further configured to: in the case that the first operator-defined dictionary is unusable in the target PLMN, send second UDC configuration information to the user equipment, where the second UDC configuration information includes indication information of using a predetermined standard dictionary or an empty dictionary without content.

Corresponding to the first embodiment of the present disclosure, the processor 601 is further configured to read the computer program in the memory to: in the case that indication information which is sent by the user equipment and indicates that the user equipment supports the first operator-defined dictionary is received, send the first UDC configuration information to the user equipment; in the case that indication information which is sent by the user equipment and indicates that the user equipment does not support the first operator-defined dictionary is received, send the second UDC configuration information to the user equipment.

Corresponding to the second embodiment of the present disclosure, the processor 601 is further configured to read the computer program in the memory to: acquire a list of available PLMNs from the source PLMN of the user equipment, where the list of available PLMNs includes identifications of PLMNs capable of using the first operator-defined dictionary; determine whether the first operator-defined dictionary is usable in the target PLMN, according to a determination of whether the target PLMN is in the list of available PLMNs.

Considering the version number of dictionary, the processor 601 is further configured to read the computer program in the memory to: acquire a list of available PLMNs and a version number of the first operator-defined dictionary stored by the user equipment, from the source PLMN of the user equipment, where the list of available PLMNs includes identifications of PLMNs capable of using the first operator-defined dictionary; in the case that the target PLMN is in the list of available PLMNs and a version number of the first operator-defined dictionary stored by the target PLMN is the same as the version number of the first operator-defined dictionary stored by the user equipment, determine that the first operator-defined dictionary is usable in the target PLMN, otherwise determine that the first operator-defined dictionary is unusable in the target PLMN.

Optionally, the processor 601 is further configured to read the computer program in the memory to: in the case that the target base station fails to acquire the list of available PLMNs from the source PLMN of the user equipment, send a terminal capability query message to the user equipment; in the case that indication information which is sent by the user equipment and indicates that the user equipment supports the first operator-defined dictionary is received, determine that the first operator-defined dictionary is usable in the target PLMN; and in the case that indication information which is sent by the user equipment and indicates that the user equipment does not support the first operator-defined dictionary is received, determine that the first operator-defined dictionary is unusable in the target PLMN.

Corresponding to the third embodiment of the present disclosure, the processor 601 is further configured to read the computer program in the memory to: acquire an identification of a home PLMN (HPLMN) of the user equipment from the source PLMN of the user equipment; determine, according to a locally maintained correspondence of PLMN and operator-defined dictionary, whether an operator-defined dictionary corresponding to the target PLMN is the same as an operator-defined dictionary corresponding to the HPLMN; and determine whether the first operator-defined dictionary is usable in the target PLMN, according to a determination of whether the operator-defined dictionary corresponding to the target PLMN is the same as the operator-defined dictionary corresponding to the HPLMN;

Considering the version number of dictionary, the processor 601 is further configured to read the computer program in the memory to: acquire an identification of a HPLMN of the user equipment from the source PLMN of the user equipment; determine, according to a locally maintained correspondence of PLMN, operator-defined dictionary and version number of dictionary, whether an operator-defined dictionary corresponding to the target PLMN is the same as an operator-defined dictionary corresponding to the HPLMN and a version number of the operator-defined dictionary corresponding to the target PLMN is the same as a version number of the operator-defined dictionary corresponding to the HPLMN; and determine whether the first operator-defined dictionary is usable in the target PLMN, according to a determination of whether the operator-defined dictionary corresponding to the target PLMN is the same as the operator-defined dictionary corresponding to the HPLMN and the version number of the operator-defined dictionary corresponding to the target PLMN is the same as the version number of the operator-defined dictionary corresponding to the HPLMN.

Optionally, the processor 601 is further configured to read the computer program in the memory to: send a terminal capability query message to the user equipment; in the case that indication information which is sent by the user equipment and indicates that the user equipment supports the first operator-defined dictionary is received, determine that the first operator-defined dictionary is usable in the target PLMN; and in the case that indication information which is sent by the user equipment and indicates that the user equipment does not support the first operator-defined dictionary is received, determine that the first operator-defined dictionary is unusable in the target PLMN.

Figure 7:
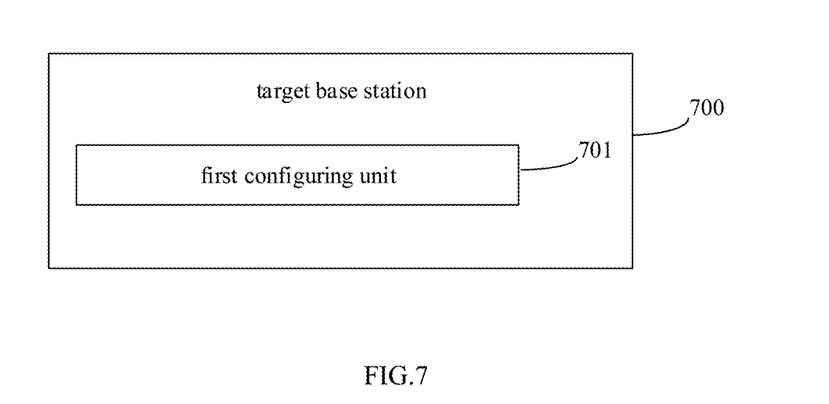
FIG. 7 is another schematic view of a target base station in an embodiment of the present disclosure.

Referring to FIG. 7, a target base station 700 is further provided in an embodiment of the present disclosure. The target base station 50 may specifically be a base station. As shown in FIG. 7, the target base station 700 includes:

a first configuring unit 701 is configured to send the first UDC configuration information to the user equipment when it is determined that the first operator-defined dictionary stored by the user equipment is usable in the target Public Land Mobile Network (PLMN);

where the target PLMN is a PLMN of the target base station and is different from a source PLMN of a source base station of the user equipment, and the first UDC configuration information includes indication information of using the first operator-defined dictionary.

Optionally, the target base station further includes:

a second configuring unit, configured to: in the case that the first operator-defined dictionary is unusable in the target PLMN, send second UDC configuration information to the user equipment, where the second UDC configuration information includes indication information of using a predetermined standard dictionary or an empty dictionary without content.

Corresponding to the first embodiment hereinabove, the first configuring unit is further configured to: in the case that indication information which is sent by the user equipment and indicates that the user equipment supports the first operator-defined dictionary is received, send the first UDC configuration information to the user equipment.

Corresponding to the first embodiment hereinabove, the second configuring unit is further configured to: in the case that indication information which is sent by the user equipment and indicates that the user equipment does not support the first operator-defined dictionary is received, send the second UDC configuration information to the user equipment.

Corresponding to the second embodiment hereinabove, the target base station further includes:

a first acquiring unit, configured to: acquire a list of available PLMNs from the source PLMN of the user equipment, where the list of available PLMNs includes identifications of PLMNs capable of using the first operator-defined dictionary;

a first determining unit, configured to: determine whether the first operator-defined dictionary is usable in the target PLMN, according to a determination of whether the target PLMN is in the list of available PLMNs.

Considering the version number of dictionary, corresponding to the second embodiment hereinabove, the target base station further includes:

a second acquiring unit, configured to: acquire a list of available PLMNs and a version number of the first operator-defined dictionary stored by the user equipment, from the source PLMN of the user equipment, where the list of available PLMNs includes identifications of PLMNs capable of using the first operator-defined dictionary;

a second determining unit, configured to, in the case that the target PLMN is in the list of available PLMNs and a version number of the first operator-defined dictionary stored by the target PLMN is the same as the version number of the first operator-defined dictionary stored by the user equipment, determine that the first operator-defined dictionary is usable in the target PLMN, otherwise determine that the first operator-defined dictionary is unusable in the target PLMN.

Optionally, the target base station further includes:

a third determining unit, configured to: in the case that the target base station fails to acquire the list of available PLMNs from the source PLMN of the user equipment, send a terminal capability query message to the user equipment; in the case that indication information which is sent by the user equipment and indicates that the user equipment supports the first operator-defined dictionary is received, determine that the first operator-defined dictionary is usable in the target PLMN; and in the case that indication information which is sent by the user equipment and indicates that the user equipment does not support the first operator-defined dictionary is received, determine that the first operator-defined dictionary is unusable in the target PLMN.

Corresponding to the third embodiment hereinabove, the target base station further includes:

a third acquiring unit, configured to: acquire an identification of a home PLMN (HPLMN) of the user equipment from the source PLMN of the user equipment;

a fourth determining unit, configured to determine, according to a locally maintained correspondence of PLMN and operator-defined dictionary, whether an operator-defined dictionary corresponding to the target PLMN is the same as an operator-defined dictionary corresponding to the HPLMN; and determine whether the first operator-defined dictionary is usable in the target PLMN, according to a determination of whether the operator-defined dictionary corresponding to the target PLMN is the same as the operator-defined dictionary corresponding to the HPLMN.

Considering the version number of dictionary, corresponding to third embodiment of the present disclosure, the target base station further includes:

a fourth acquiring unit, configured to acquire an identification of a HPLMN of the user equipment from the source PLMN of the user equipment;

a fifth determining unit, configured to determine, according to a locally maintained correspondence of PLMN, operator-defined dictionary and version number of dictionary, whether an operator-defined dictionary corresponding to the target PLMN is the same as an operator-defined dictionary corresponding to the HPLMN and a version number of the operator-defined dictionary corresponding to the target PLMN is the same as a version number of the operator-defined dictionary corresponding to the HPLMN; and determine whether the first operator-defined dictionary is usable in the target PLMN, according to a determination of whether the operator-defined dictionary corresponding to the target PLMN is the same as the operator-defined dictionary corresponding to the HPLMN and the version number of the operator-defined dictionary corresponding to the target PLMN is the same as the version number of the operator-defined dictionary corresponding to the HPLMN.

Optionally, the target base station further includes:

a sixth determining unit, configured to: send a terminal capability query message to the user equipment in the case that in the case that the target base station fails to acquire the list of available PLMNs from the source PLMN of the user equipment; in the case that indication information which is sent by the user equipment and indicates that the user equipment supports the first operator-defined dictionary is received, determine that the first operator-defined dictionary is usable in the target PLMN; and in the case that indication information which is sent by the user equipment and indicates that the user equipment does not support the first operator-defined dictionary is received, determine that the first operator-defined dictionary is unusable in the target PLMN.

Persons of ordinary skill in the art may realize that the units and algorithm steps of the examples described in conjunction with the embodiments disclosed herein can be implemented by electronic hardware, or a combination of computer software and electronic hardware. Whether these functions are executed in hardware or software depends on the specific application of the technical solution and design constraints. Professional technicians can use different methods to implement the described functions for each specific application, but such embodiment should not be considered beyond the scope of the present disclosure.

Those skilled in the art can clearly understand that for the convenience and conciseness of the description, the specific working process of the system, device, and unit described above can refer to the corresponding process in the foregoing method embodiments, and details are not described herein again.

In the embodiments provided in this application, it should be understood that the disclosed device and method may be implemented in other ways. For example, the device embodiments described above are only schematic. For example, the division of the unit is only a logical function division, and there may be other divisions in actual embodiment, for example, multiple units or components may be combined or can be integrated into another system, or some features can be ignored, or not implemented. In addition, the displayed or discussed mutual coupling or direct coupling or communication connection may be indirect coupling or communication connection through some interfaces, devices or units, and may be in electrical, mechanical, or other forms.

The units described as separate components may or may not be physically separated, and the components displayed as units may or may not be physical units, that is, they may be located in one place, or may be distributed on multiple network units. Some or all of the units may be selected according to actual needs to achieve the objectives of the solutions of the embodiments of the present disclosure.

In addition, each functional unit in each embodiment of the present disclosure may be integrated into one processing unit, or each unit may exist alone physically, or two or more units may be integrated into one unit.

If the functions are implemented in the form of software functional units and sold or used as independent products, they can be stored by a computer-readable storage medium. Based on this understanding, the technical solution of the present disclosure essentially or part of the contribution to the existing technology or the technical solution can be embodied in the form of a software product, the computer software product is stored by a storage medium, including Several instructions are configured to enable a computer device (which may be a personal computer, server, or network device, etc.) to perform all or part of the steps of the method of configuring uplink data compression in various embodiments of the present disclosure. The foregoing storage media include various media that can store program codes, such as a U disk, a mobile hard disk, a ROM, a RAM, a magnetic disk, or an optical disk.

The above are only some embodiments of the present disclosure, but the scope of protection of the present disclosure is not limited thereto. Any person skilled in the art can easily think of changes or replacements within the technical scope disclosed by the present disclosure, and these changes or replacements should be covered by the scope of the present disclosure. Therefore, the scope of the present disclosure shall be subject to the scope of the claims.

What is claimed is:

1. A method of configuring Uplink Data Compression (UDC), comprising:
   in a case that first UDC configuration information sent by a target base station is received by a user equipment, configuring, by the user equipment, an operator-defined dictionary stored by the user equipment for a compression processing of uplink data, according to the first UDC configuration information;
   wherein the first UDC configuration information comprises indication information of using the operator-defined dictionary stored by the user equipment, and a target Public Land Mobile Network (PLMN) of the target base station is different from a source PLMN of a source base station of the user equipment.

2. The method according to claim 1, further comprising:
   in a case that second UDC configuration information sent by the target base station is received by the user equipment, configuring, by the user equipment, a predetermined standard dictionary for the compression processing of uplink data or a cancelling of the compression processing of uplink data, according to the second UDC configuration information;
   wherein the second UDC configuration information comprises indication information of using the predetermined standard dictionary or an empty dictionary without content.

3. The method according to claim 2, wherein before the first UDC configuration information or the second UDC configuration information is received, the method further comprises:
   acquiring, by the user equipment, the operator-defined dictionary and a list of available PLMNs, and storing, by the user equipment, the operator-defined dictionary and the list of available PLMNs locally, wherein the list of available PLMNs comprises identifications of PLMNs capable of using the operator-defined dictionary.

4. The method according to claim 3, wherein before the first UDC configuration information or the second UDC configuration information is received, the method further comprises:
  in the case that the user equipment accesses the target PLMN, determining, by the user equipment, whether the target PLMN is in the list of available PLMNs stored by the user equipment;
  in the case that the target PLMN is in the list of available PLMNs, sending to the target base station, by the user equipment, indication information indicating that the user equipment supports the operator-defined dictionary;
  in the case that the target PLMN is not in in the PLMN list, sending to the target base station, by the user equipment, indication information indicating that the user equipment does not support the operator-defined dictionary.

5. The method according to claim 3, wherein subsequent to the acquiring, by the user equipment, the operator-defined dictionary and the list of available PLMNs and storing, by the user equipment, the operator-defined dictionary and the list of available PLMNs locally, the method further comprises:
  sending, by the user equipment, the list of available PLMNs to the source PLMN;
  acquiring, by the user equipment, a version number of the operator-defined dictionary when acquiring the operator-defined dictionary; and
  sending, by the user equipment, the version number of the operator-defined dictionary to the source PLMN.

6. The method according to claim 5, wherein the user equipment sends the list of available PLMNs to the source PLMN through a UE-EUTRA-Capability message.

7. A computer-readable storage medium, wherein a computer program is stored in the computer-readable storage medium, and a processor executes the computer program to perform the method of configuring UDC according to claim 1.

8. A method of configuring Uplink Data Compression (UDC), comprising:
  in the case that a target base station determines that a first operator-defined dictionary stored by a user equipment is usable in a target Public Land Mobile Network (PLMN), sending, by the target base station, first UDC configuration information to the user equipment;
  wherein the target PLMN is a PLMN of the target base station and is different from a source PLMN of a source base station of the user equipment, and the first UDC configuration information comprises indication information of using the first operator-defined dictionary.

9. The method according to claim 8, further comprising:
  in the case that the target base station determines that the first operator-defined dictionary is unusable in the target PLMN, sending, by the target base station, second UDC configuration information to the user equipment, wherein the second UDC configuration information comprises indication information of using a predetermined standard dictionary or an empty dictionary without content.

10. The method according to claim 9, wherein the target base station determining that the first operator-defined dictionary is unusable in the target PLMN comprises:
  receiving, by the target base station, indication information which is sent by the user equipment and indicates that the user equipment does not support the first operator-defined dictionary.

11. The method according to claim 9, wherein the determining whether the first operator-defined dictionary is usable in the target PLMN further comprises:
  acquiring, by the target base station, a list of available PLMNs from the source PLMN of the user equipment, wherein the list of available PLMNs comprises identifications of PLMNs capable of using the first operator-defined dictionary;
  determining whether the first operator-defined dictionary is usable in the target PLMN, according to a determination of whether the target PLMN is in the list of available PLMNs.

12. The method according to claim 9, wherein the determining whether the first operator-defined dictionary is usable in the target PLMN further comprises:
  acquiring, by the target base station, a list of available PLMNs and a version number of the first operator-defined dictionary stored by the user equipment, from the source PLMN of the user equipment, wherein the list of available PLMNs comprises identifications of PLMNs capable of using the first operator-defined dictionary;
  in the case that the target PLMN is in the list of available PLMNs and a version number of the first operator-defined dictionary stored by the target PLMN is the same as the version number of the first operator-defined dictionary stored by the user equipment, determining that the first operator-defined dictionary is usable in the target PLMN, otherwise determining that the first operator-defined dictionary is unusable in the target PLMN;
  in the case that the target base station fails to acquire the list of available PLMNs from the source PLMN of the user equipment, the determining whether the first operator-defined dictionary is usable in the target PLMN further comprises:
  sending, by the target base station, a terminal capability query message to the user equipment;
  in the case that the target base station receives indication information which is sent by the user equipment and indicates that the user equipment supports the first operator-defined dictionary, determining that the first operator-defined dictionary is usable in the target PLMN; and
  in the case that the target base station receives indication information which is sent by the user equipment and indicates that the user equipment does not support the first operator-defined dictionary, determining that the first operator-defined dictionary is unusable in the target PLMN.

13. The method according to claim 8, wherein the target base station determining that the first operator-defined dictionary stored by the user equipment is usable in the target PLMN comprises:
  receiving, by the target base station, indication information which is sent by the user equipment and indicates that the user equipment supports the first operator-defined dictionary.

14. A computer-readable storage medium, wherein a computer program is stored in the computer-readable storage medium, and a processor executes the computer program to perform the method of configuring UDC according to claim 8.

15. A user equipment, comprising: a transceiver, a memory, a processor and a computer program stored in the memory and executable on the processor, wherein the transceiver is configured to receive first UDC configuration information sent by a target base station;
the processor is configured to read a program in the memory to:
in a case that first UDC configuration information sent by a target base station is received, configure an operator-defined dictionary stored by the user equipment for a compression processing of uplink data according to the first UDC configuration information;
wherein the first UDC configuration information comprises indication information of using the operator-defined dictionary stored by the user equipment, and a target Public Land Mobile Network (PLMN) of the target base station is different from a source PLMN of a source base station of the user equipment.

16. The user equipment according to claim 15, wherein the transceiver is further configured to receive second UDC configuration information sent by the target base station;
the processor is further configured to read the program in the memory to: in a case that second UDC configuration information sent by the target base station is received, configure a predetermined standard dictionary for the compression processing of uplink data or a cancelling of the compression processing of uplink data according to the second UDC configuration information;
wherein the second UDC configuration information comprises indication information of using the predetermined standard dictionary or an empty dictionary without content.

17. A target base station, comprising: a transceiver, a memory, a processor and a computer program stored in the memory and executable on the processor, wherein
the processor is configured to read the computer program in the memory to: determine whether a first operator-defined dictionary stored by a user equipment is usable in a target Public Land Mobile Network (PLMN);
the transceiver is configured to: send first UDC configuration information to the user equipment, in the case that the first operator-defined dictionary stored by the user equipment is usable in the target PLMN;
wherein the target PLMN is a PLMN of the target base station and is different from a source PLMN of a source base station of the user equipment, and the first UDC configuration information comprises indication information of using the first operator-defined dictionary.

18. The target base station according to claim 17, wherein the transceiver is further configured to: in the case that the first operator-defined dictionary is unusable in the target PLMN, send second UDC configuration information to the user equipment, wherein the second UDC configuration information comprises indication information of using a predetermined standard dictionary or an empty dictionary without content.

19. The target base station according to claim 18, wherein the processor is further configured to read the computer program in the memory to:
in the case that indication information which is sent by the user equipment and indicates that the user equipment supports the first operator-defined dictionary is received, send the first UDC configuration information to the user equipment;
in the case that indication information which is sent by the user equipment and indicates that the user equipment does not support the first operator-defined dictionary is received, send the second UDC configuration information to the user equipment.

20. The target base station according to claim 18, wherein the processor is further configured to read the computer program in the memory to: acquire a list of available PLMNs from the source PLMN of the user equipment, wherein the list of available PLMNs comprises identifications of PLMNs capable of using the first operator-defined dictionary; determine whether the first operator-defined dictionary is usable in the target PLMN, according to a determination of whether the target PLMN is in the list of available PLMNs;
the processor is further configured to read the computer program in the memory to: acquire a list of available PLMNs and a version number of the first operator-defined dictionary stored by the user equipment, from the source PLMN of the user equipment, wherein the list of available PLMNs comprises identifications of PLMNs capable of using the first operator-defined dictionary; in the case that the target PLMN is in the list of available PLMNs and a version number of the first operator-defined dictionary stored by the target PLMN is the same as the version number of the first operator-defined dictionary stored by the user equipment, determine that the first operator-defined dictionary is usable in the target PLMN, otherwise determine that the first operator-defined dictionary is unusable in the target PLMN;
the processor is further configured to read the computer program in the memory to:
in the case that the target base station fails to acquire the list of available PLMNs from the source PLMN of the user equipment, send a terminal capability query message to the user equipment;
in the case that indication information which is sent by the user equipment and indicates that the user equipment supports the first operator-defined dictionary is received, determine that the first operator-defined dictionary is usable in the target PLMN; and
in the case that indication information which is sent by the user equipment and indicates that the user equipment does not support the first operator-defined dictionary is received, determine that the first operator-defined dictionary is unusable in the target PLMN.

* * * * *